United States Patent
Sai et al.

(10) Patent No.: US 11,567,021 B2
(45) Date of Patent: Jan. 31, 2023

(54) GAS DETECTION DEVICE AND GAS DETECTION METHOD

(71) Applicant: Figaro Engineering Inc., Minoo (JP)

(72) Inventors: Masakazu Sai, Minoo (JP); Kuniyuki Izawa, Minoo (JP); Tomohiro Kawaguchi, Minoo (JP)

(73) Assignee: FIGARO ENGINEERING INC., Osaka (JP)

( * ) Notice: Subject to any disclaimer, the term of this patent is extended or adjusted under 35 U.S.C. 154(b) by 73 days.

(21) Appl. No.: 16/973,063

(22) PCT Filed: Apr. 24, 2019

(86) PCT No.: PCT/JP2019/017382
§ 371 (c)(1),
(2) Date: Dec. 8, 2020

(87) PCT Pub. No.: WO2019/244475
PCT Pub. Date: Dec. 26, 2019

(65) Prior Publication Data
US 2021/0270760 A1 Sep. 2, 2021

(30) Foreign Application Priority Data

Jun. 21, 2018 (JP) .............................. JP2018-118063

(51) Int. Cl.
*G01N 27/12* (2006.01)
(52) U.S. Cl.
CPC ......... *G01N 27/121* (2013.01); *G01N 27/123* (2013.01)

(58) Field of Classification Search
CPC ... G01N 27/121; G01N 27/123; G01N 27/128
See application file for complete search history.

(56) References Cited

U.S. PATENT DOCUMENTS

| 2,742,780 | A | * | 4/1956 | Feigal | .................. | G01N 27/121 |
| | | | | | | 73/73 |
| 3,968,342 | A | * | 7/1976 | Inaba | .................... | G01N 27/121 |
| | | | | | | 219/203 |
| 4,080,564 | A | * | 3/1978 | Nitta | ..................... | G01N 27/121 |
| | | | | | | 324/696 |

(Continued)

FOREIGN PATENT DOCUMENTS

| JP | 5319027 B2 | * | 10/2013 | ............. | G01N 27/12 |
| JP | 6274649 B2 | | 2/2018 | | |
| WO | WO-2018097270 A1 | * | 5/2018 | ............. | G01N 27/12 |

OTHER PUBLICATIONS

Machine translation of JP-5319027-B2 (Year: 2013).*
Machine translation of WO-2018097270-A1 (Year: 2018).*

*Primary Examiner* — David J Bolduc
(74) *Attorney, Agent, or Firm* — Keating and Bennett, LLP

(57) ABSTRACT

A gas detector uses a MEMS gas sensor having: a substrate provided with a cavity and an insulating film over the cavity; a metal oxide semiconductor and a heater both provided on the insulating film. A drive circuit operates the heater with a predetermined period for a predetermined pulse duration in order to heat the metal oxide semiconductor. The drive circuit halts operation of the heater or elongates the period when a humidity sensor detects that the atmosphere is humid.

5 Claims, 7 Drawing Sheets

(56) References Cited

U.S. PATENT DOCUMENTS

| | | | | |
|---|---|---|---|---|
| 4,210,894 A | * | 7/1980 | Nitta | G01N 27/121 338/322 |
| 4,270,085 A | * | 5/1981 | Terada | G01N 33/0067 324/694 |
| 4,326,414 A | * | 4/1982 | Terada | G01N 27/121 324/703 |
| 4,419,021 A | * | 12/1983 | Terada | G01N 27/121 236/46 C |
| 4,501,147 A | * | 2/1985 | Niwa | H05B 6/6458 219/707 |
| 4,768,012 A | * | 8/1988 | Williams | G01N 27/121 338/34 |
| 4,801,211 A | * | 1/1989 | Yagi | G01N 27/121 236/44 E |
| 4,816,748 A | * | 3/1989 | Tazawa | G01N 27/223 324/711 |
| 5,343,746 A | * | 9/1994 | Choi | G01N 27/122 73/335.05 |
| 5,396,796 A | * | 3/1995 | Kotani | G01N 27/121 73/431 |
| 5,515,723 A | * | 5/1996 | Tsuchida | G01N 27/122 73/29.02 |
| 5,531,097 A | * | 7/1996 | Tsuchida | G01N 27/121 73/29.02 |
| 2015/0233856 A1 | * | 8/2015 | Samuilov | G01N 27/127 702/65 |
| 2016/0084786 A1 | * | 3/2016 | Suzuki | G01N 27/12 73/31.06 |
| 2017/0030851 A1 | * | 2/2017 | Kardassakis | H02H 5/083 |
| 2019/0250134 A1 | * | 8/2019 | Murata | G08B 21/16 |
| 2020/0049644 A1 | * | 2/2020 | Wu | G01N 27/123 |
| 2021/0088464 A1 | * | 3/2021 | Rabe | G01N 33/0014 |

\* cited by examiner

F I G. 8
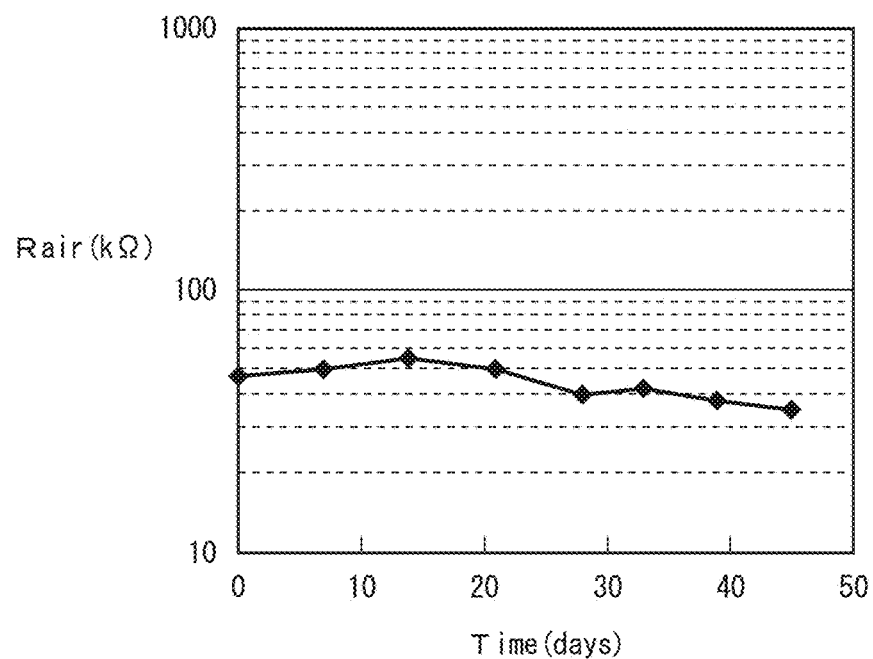
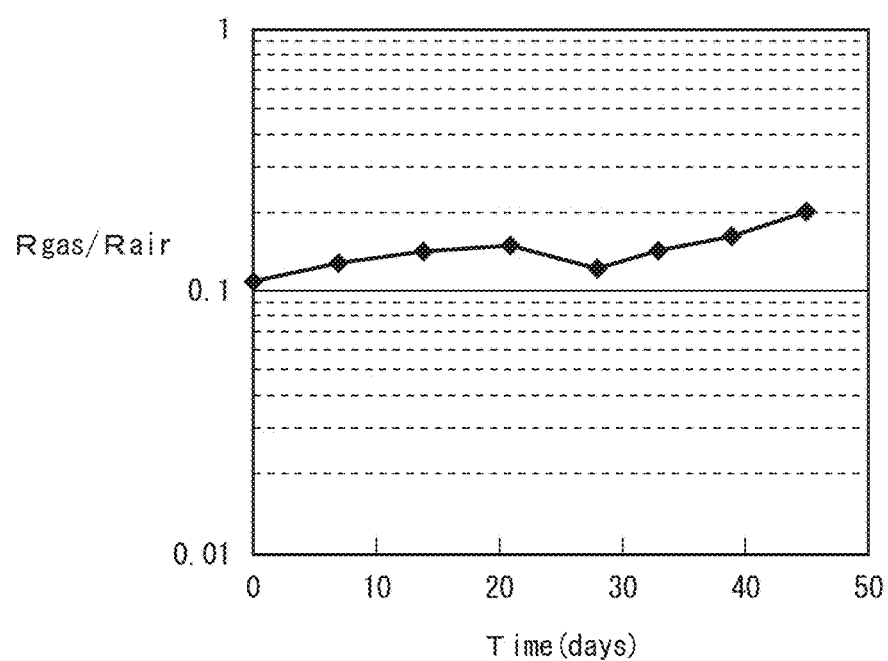

GAS DETECTION DEVICE AND GAS DETECTION METHOD

FIELD OF THE INVENTION

The present invention relates to a gas detector and a gas detection method.

BACKGROUND ART

MEMS metal oxide semiconductor gas sensors are easily affected by humidity (Patent Document 1: JP 6274,649B). MEMS gas sensors are typically operated such that the metal oxide semiconductor is periodically heated with a predetermined period for a predetermined time duration and that the resistance of the metal oxide semiconductor during the heating is used for gas detection. At the first stage during the heating, the resistance of the metal oxide semiconductor decreases rapidly. JP 6274,649B teaches to detect humidity in the ambient atmosphere according to the gas sensor signal during the first stage based upon that the decrease in the resistance is slow under highly humid conditions and fast under dry or moderately humid conditions.

When gas sensors are kept under humid conditions for a long time, the resistance of the metal oxide semiconductor generally increases both in air and in gas. For reducing the effect of this phenomenon, JP 6274,649B teaches to lower the threshold for gas detection under humid conditions when the resistance in air has increased.

PRIOR DOCUMENT LIST

Patent Document

Patent Document 1: JP 6274,649B

SUMMARY OF THE INVENTION

Problem to be Solved by the Invention

Methods according to JP 6274,649B can detect gases under humid conditions but can not prevent the influence of highly humid conditions on gas sensors. The object of the invention is to prevent the influence of highly humid conditions on MEMS gas sensors using metal oxide semiconductors.

Means for Solving the Problem

A gas detector according to the invention comprises: a MEMS gas sensor having: a substrate being provided with a cavity and an insulating film over the cavity; a metal oxide semiconductor being provided on the insulating film; and a heater being provided on the insulating film;

a drive circuit operating the heater with a predetermined period for a predetermined pulse duration in order to heat the metal oxide semiconductor; and a detection means for humidity for detecting humidity in an atmosphere, and the drive circuit is configured and programmed to halt operation of the heater or to elongate the period when the detection means for humidity detects that the atmosphere is humid.

A gas detection method according to the invention uses a MEMS gas sensor having: a substrate being provided with a cavity and an insulating film over the cavity; a metal oxide semiconductor being provided on the insulating film; and a heater being provided on the insulating film.

The metal oxide semiconductor is heated by operating the heater with a predetermined period for a predetermined pulse duration;

humidity in an atmosphere is detected by a detection means for humidity; and the operation of the heater is halted or the period is elongated by the drive circuit when the detection means for humidity detects that the atmosphere is humid.

The behaviors of MEMS gas sensors in a humid atmosphere are indicated in FIGS. 5 to 9. The species of the metal oxide semiconductor is $SnO_2$, and, under usual conditions, the heater is operated with a 0.5 second period for 0.1 second. If the operation conditions of the gas sensor is not changed in a humid atmosphere (50 degree Celsius and 90% RH), the resistance of the metal oxide semiconductor increases and the gas response decreases as shown in FIG. 7. These phenomena do not change when the species of the metal oxide semiconductor is changed or when the operation period of the gas sensor and the pulse duration of the heating is changed. The humidity detection means is a humidity sensor separate from the MEMS gas sensor or the MEMS gas sensor itself. The detection of humidity by the MEMS gas sensor itself will be described. When the metal oxide semiconductor is heated pulsively by the drive circuit, the resistance of the metal oxide semiconductor decreases rapidly. When the humidity is high, the time constant for the resistance to decrease is longer and when the humidity is low, the time constant for the resistance to decrease is shorter. Therefore, humidity can be detected according to the time constant. This invention detects that the atmosphere is humid so as to prevent the gas sensor from being affected by the humid atmosphere. Therefore, a strict threshold for high humidity is not needed. Practically, if the humidity signal from the MEMS gas sensor or the signal of the humidity sensor satisfies a predetermined condition, the atmosphere is deemed humid.

Under humid conditions, when the operation of the gas sensor is halted, namely, when the heater is not operated and the metal oxide semiconductor is kept at an ambient temperature, the resistance is stable and the gas response is also stable (FIG. 5). Alternatively, when the operation period for the heater is elongated to 60 seconds (FIG. 8) or to 120 seconds (FIG. 9), the drift in the resistance and the drift in the gas response become both small. In addition, when the heater is continuously operated under humid conditions, the resistance and also the gas response become stable (FIG. 6). However, this needs a high power consumption and is not practical.

Preferably, the drive circuit is configured and programmed to halt the heater and to stop gas detection when the detection means for humidity detects that the atmosphere is humid. When the heating of the metal oxide semiconductor is halted under humid conditions the influence of humidity against the gas sensor is prevented (FIG. 5).

Preferably, the drive circuit is configured and programmed to elongate the period at least by 10 times and to detect gas with the elongated period when the detection means for humidity detects that the atmosphere is humid. When the period is elongated, namely, when the heating frequency of the metal oxide semiconductor is reduced, the influence of humidity against the gas sensor is reduced (FIGS. 8 and 9). More preferably, the period is elongated at least by 50 times. When the period is elongated, the heater is operated for the same pulse duration, and gas is detectable as usual but with a longer period.

BRIEF DESCRIPTION OF THE DRAWINGS

FIG. 8: A characteristic diagram when the gas sensor was heated with an extended 60 second period under the highly humid condition: in (A), the transition in gas sensor resistance under the humid condition is revealed, and in (B), the transition in gas sensor response is revealed.

FEATURES FOR CARRYING OUT THE INVENTION

The best embodiment for carrying out the invention will be described.

Embodiment

Figure 1:
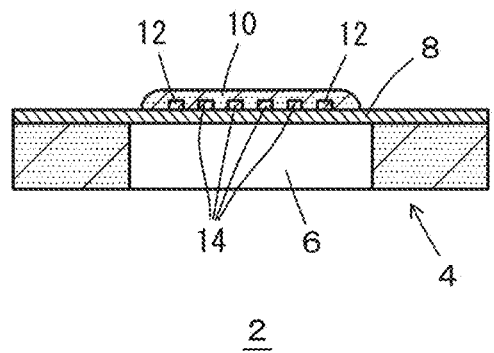
FIG. 1: A sectional view of a gas sensor.

FIGS. 1 to 9 indicate a gas detector and a gas detection method both according to an embodiment. FIG. 1 indicates an example of MEMS gas sensor 2; indicated by 4 is a substrate such as silicon, by 6 is a cavity, and by 8 is an electrically insulating film having a shape of diaphragm or a bridge. On the insulating film 8, a thick film of metal oxide semiconductor 10 is provided, the metal oxide semiconductor 10 is heated by a heater 12, and from electrodes 14, 14, the resistance of the metal oxide semiconductor 10 is extracted. As a modification, without the electrodes 14, the parallel resistance of the heater 12 and the metal oxide semiconductor 10 may be outputted. The metal oxide semiconductor 10 is for example $SnO_2$ but may be $WO_3$, $In_2O_3$, or the like, and the species of the metal oxide semiconductor is arbitrary. The MEMS gas sensor 2 is further provided with a housing, a filter such as activated carbon, and so on.

Figure 2:
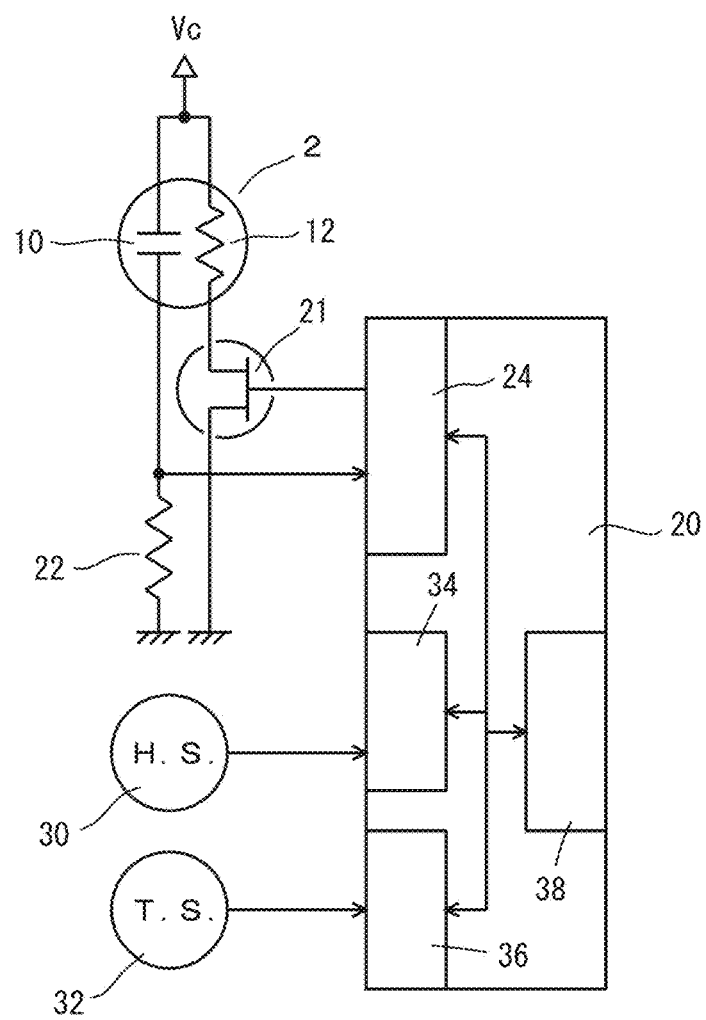
FIG. 2: A block diagram of a gas detector according to the embodiment.

FIG. 2 indicates the gas detector. An IC 20 drives the gas sensor 2, a humidity sensor 30 that detects relative humidity for example, and a temperature sensor 32, and outputs the sensor signal from an output interface 38. Without the humidity sensor 30, relative humidity can be detected based upon the signal of the gas sensor 2 as described in Patent Document 1. In addition, the gas detector is operated by the power from a battery, for example. A gas sensor drive 24 makes a switch 21 on and off so as to control the heater 12. Further, the gas sensor drive 24 converts the voltage across a resistance 22 connected to the metal oxide semiconductor 10 into a digital value in order to detect gases. A humidity sensor drive 34 detects relative humidity or absolute humidity based upon the output of the humidity sensor 30. A temperature sensor drive 36 detects ambient temperature based upon the output of the temperature sensor 32. The gas detector is installed within a portable electronic device and detects ambient gases and odors.

Figure 3:
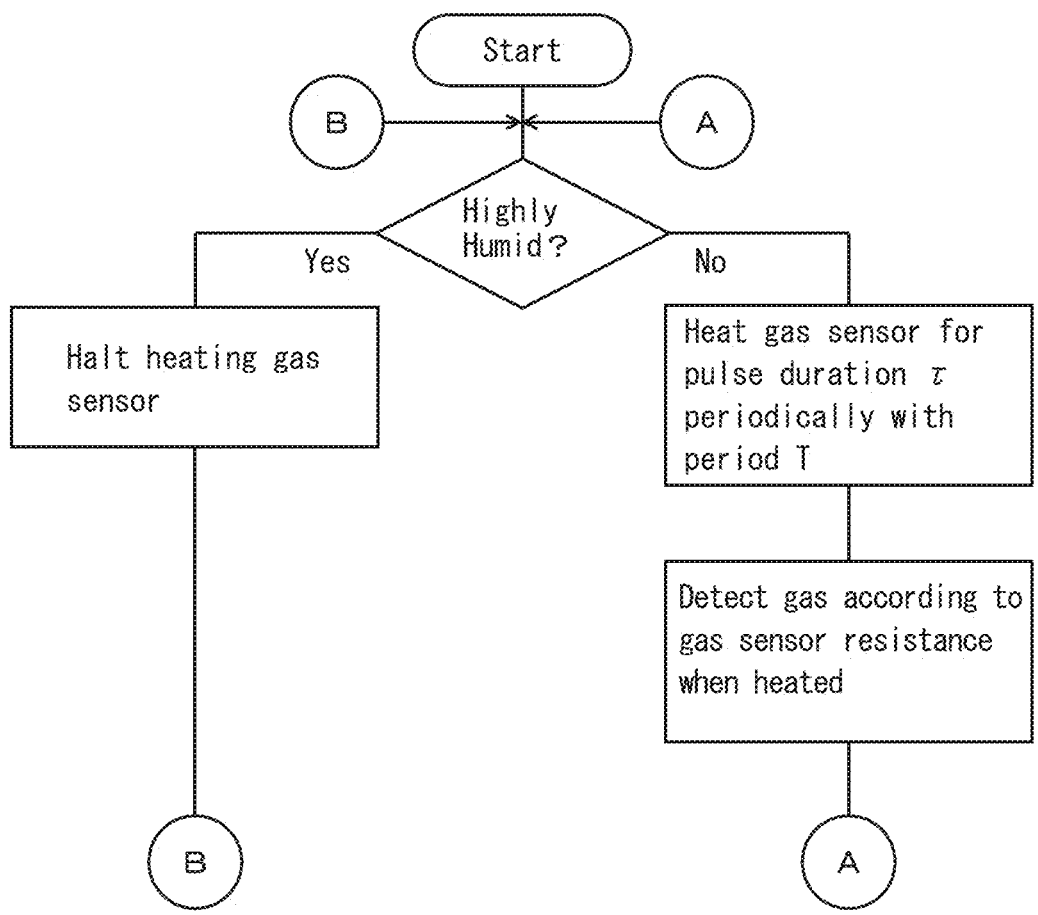
FIG. 3: A flowchart indicating a gas detection method according to the embodiment.

FIG. 3 indicates the gas detection method according to the embodiment. Whether the ambient atmosphere is highly humid or not is detected according to the humidity sensor output. Here, the highly humid condition is one when the relative humidity is 80% or more. Under the highly humid condition, the operation of the gas sensor 2 is halted, and the metal oxide semiconductor 10 is kept at a room temperature. When the atmosphere becomes not highly humid, the gas sensor 2 is operated with a predetermined period.

Figure 4:
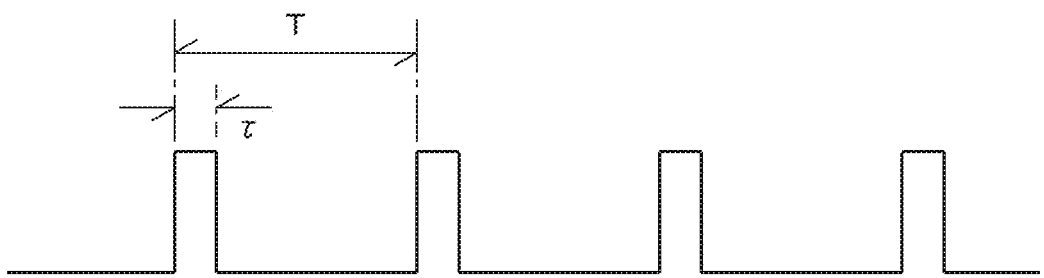
FIG. 4: A waveform diagram indicating a heating period and heating pulse duration under the normal condition.

FIG. 4 indicates the driving pattern of the gas sensor 2. The gas sensor 2 is operated with a period T, the heater 12 is heated for a pulse duration tau once for the period such that the metal oxide semiconductor 10 is heated to an operating temperature. The period T is, for example, not shorter than 0.2 second and not longer than 60 seconds, preferably, not shorter than 0.2 second and not longer than 10 seconds, and is 0.5 second according to the embodiment. The pulse duration tau is, for example, not shorter than 0.03 second and not longer than 1 second and is 0.1 second according to the embodiment. According to the embodiment, the heater 14 is operated for 0.1 second and halted for 0.4 second. The metal oxide semiconductor 10 heated to 300 to 450 degree Celsius at its maximum temperature by the heater 12, and the resistance of the metal oxide semiconductor 10 when heated is used for detecting ethanol, VOC, hydrogen, odorous substances, or the like.

Instead of halting the heating under highly humid conditions, the heating period T may be extended. For example, the heating period T may be elongated by 10 times or more, preferably, by 50 times or more, and preferably, the pulse duration tau is not changed when the heating period is elongated. The heating period T is preferably elongated to 30 seconds or longer, and more preferably, 50 seconds or more when the heating period is extended. Here, the upper limit of the heating period is meaningless and arbitrary. In addition, it is preferable to halt the heating of the gas sensor 2 more promptly under highly humid conditions at high temperatures than under highly humid conditions at low or medium temperatures. For example, the heating of the gas sensor 2 is halted at a relative humidity of 90% or more at low or medium temperatures (lower than 30 degree Celsius) and is halted at a relative humidity of 80% or more at high temperatures (30 degree Celsius or more). Alternatively, the heating of the gas sensor 2 may be halted immediately under high temperature and highly humid conditions and may be halted when a highly humid condition has continued for a predetermined period (for example, one day) at low or medium temperatures.

FIGS. 5 to 9 indicate the transitions in the resistances of the gas sensors 2 and their response to a gas for 45 days under a highly humid high temperature condition (50 degree Celsius and 90% RH). In each of the drawings, in (A), the indicated is the transitions in the resistance (Rair) of the metal oxide semiconductor 10 in air, and in (B), the transitions in the response to 10 ppm ethanol (Rgas/Rair). The heating periods in the drawings are shown in Table 1. While, in FIG. 5, the heating was halted under the highly humid high temperature condition, in other drawings, the maximum temperature of the metal oxide semiconductor 10 was at 400 degree Celsius. According to the experiences of the inventors, the gas sensor 2 is influenced under highly humid conditions, and the influence is larger under highly humid and high temperature conditions than under highly humid but low or medium temperature conditions.

TABLE 1

Heating Periods of Gas Sensor

Figure 5:
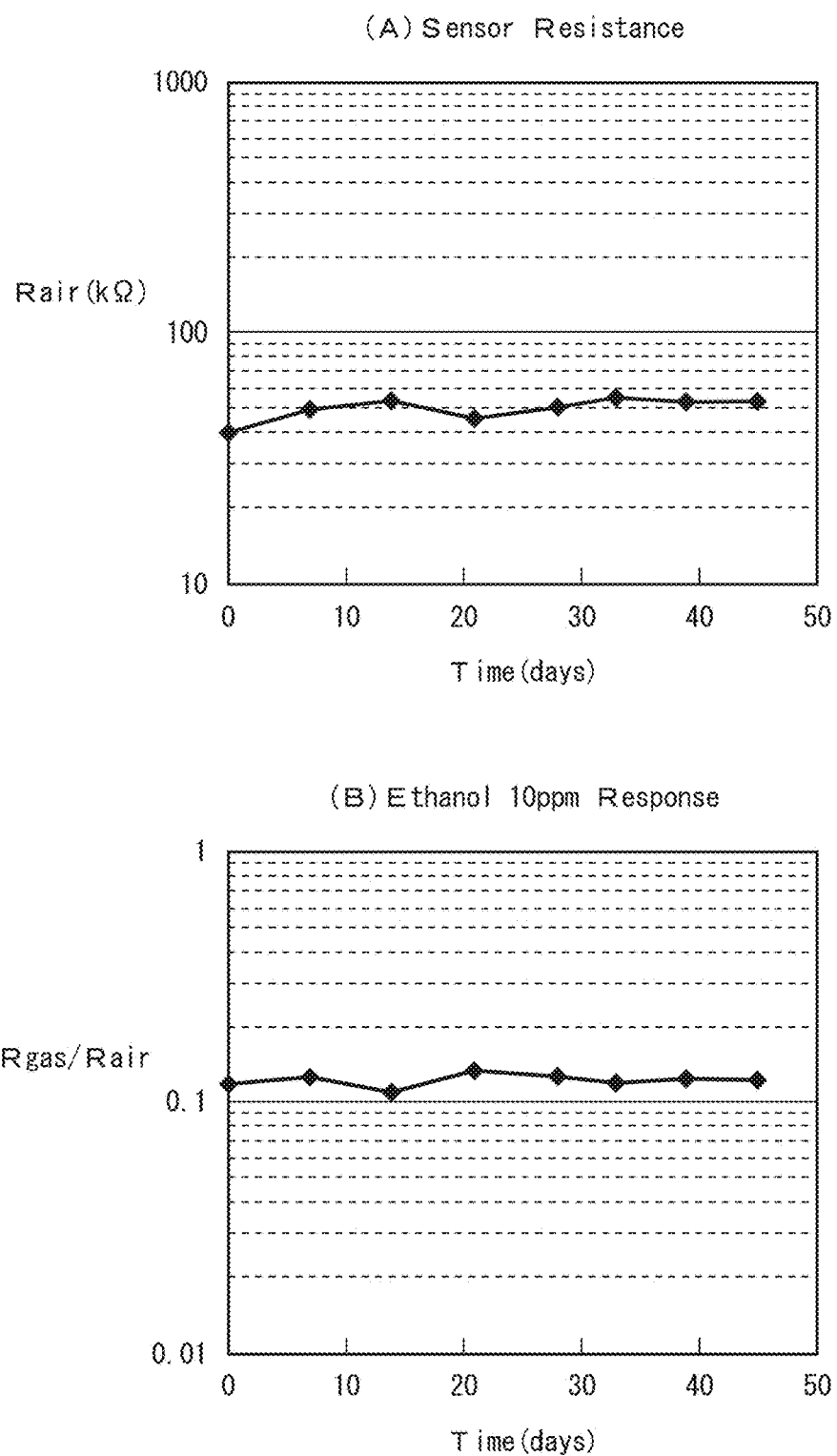
FIG. 5: A characteristic diagram when heating of the gas sensor was halted under a highly humid condition: in (A), the transition in gas sensor resistance under the humid condition is revealed, and in (B), the transition in gas sensor response is revealed.
Figure 6:
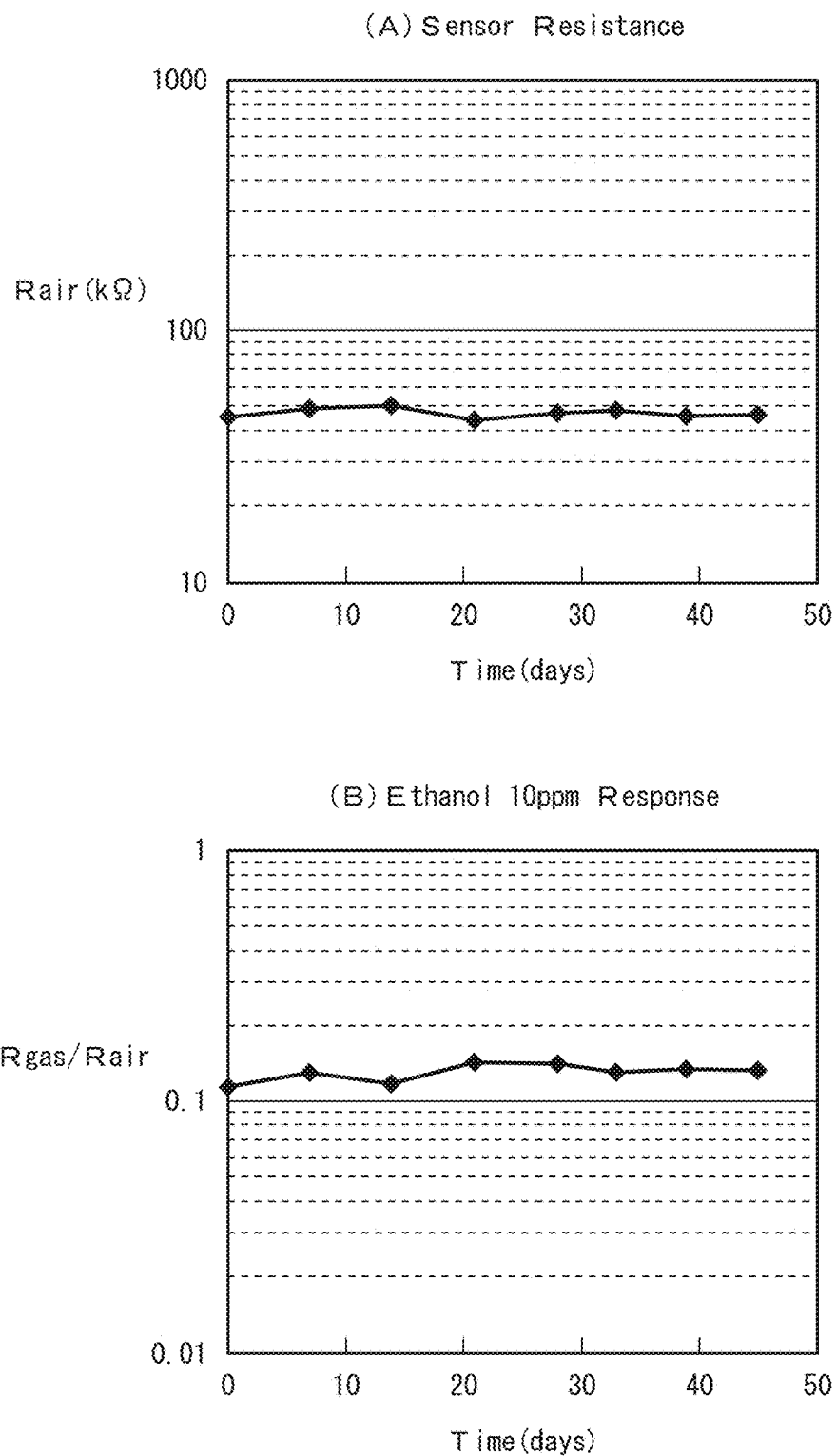
FIG. 6: A characteristic diagram when the gas sensor was continuously heated under the highly humid condition: in (A), the transition in gas sensor resistance under the humid condition is revealed, and in (B) the transition in gas sensor response is revealed.
Figure 7:
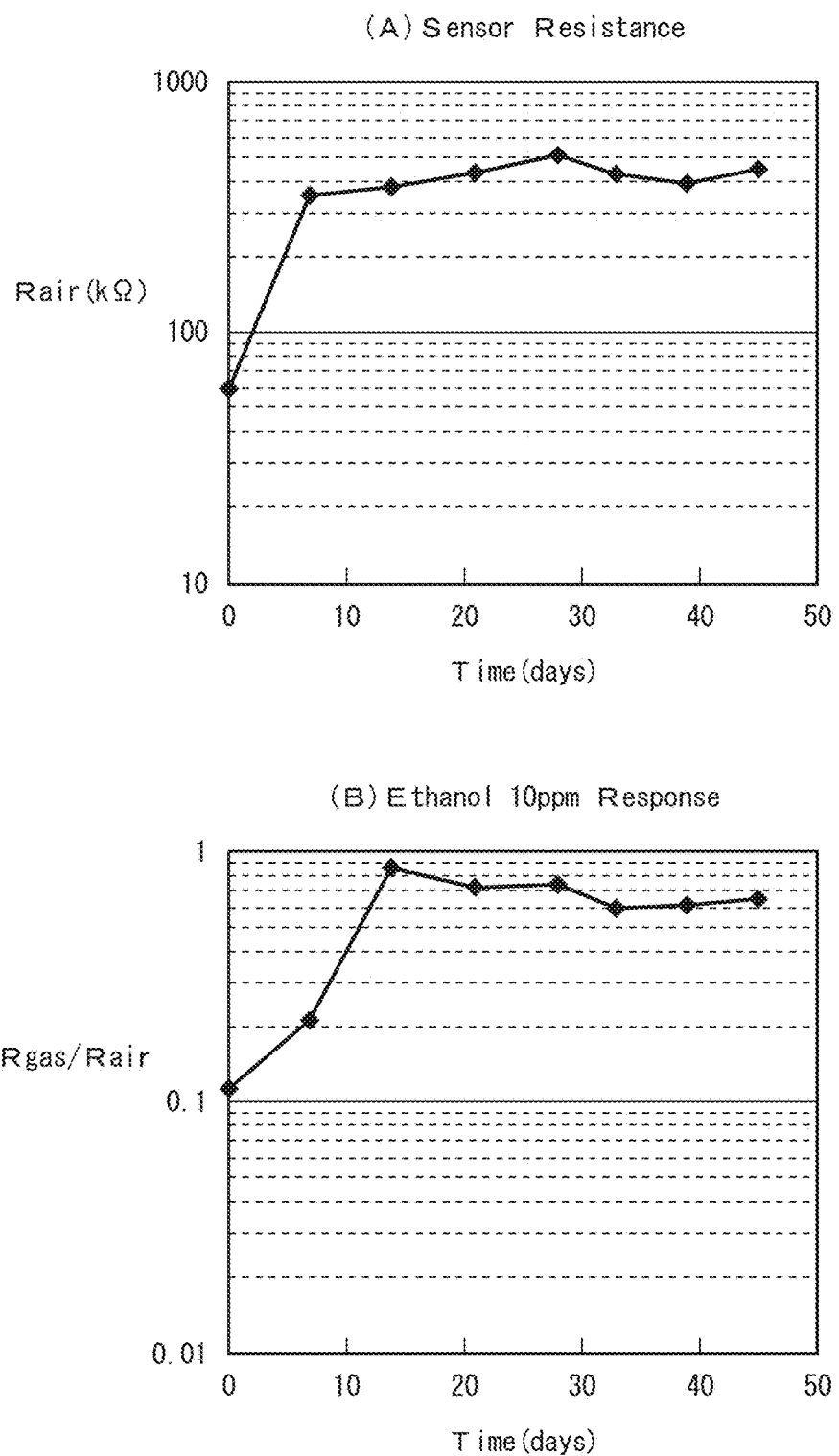
FIG. 7: A characteristic diagram when the gas sensor was heated with a 0.5 second period as usual under the highly humid condition: in (A), the transition in gas sensor resistance under the humid condition is revealed, and in (B), the transition in gas sensor response is revealed.
Figure 9:
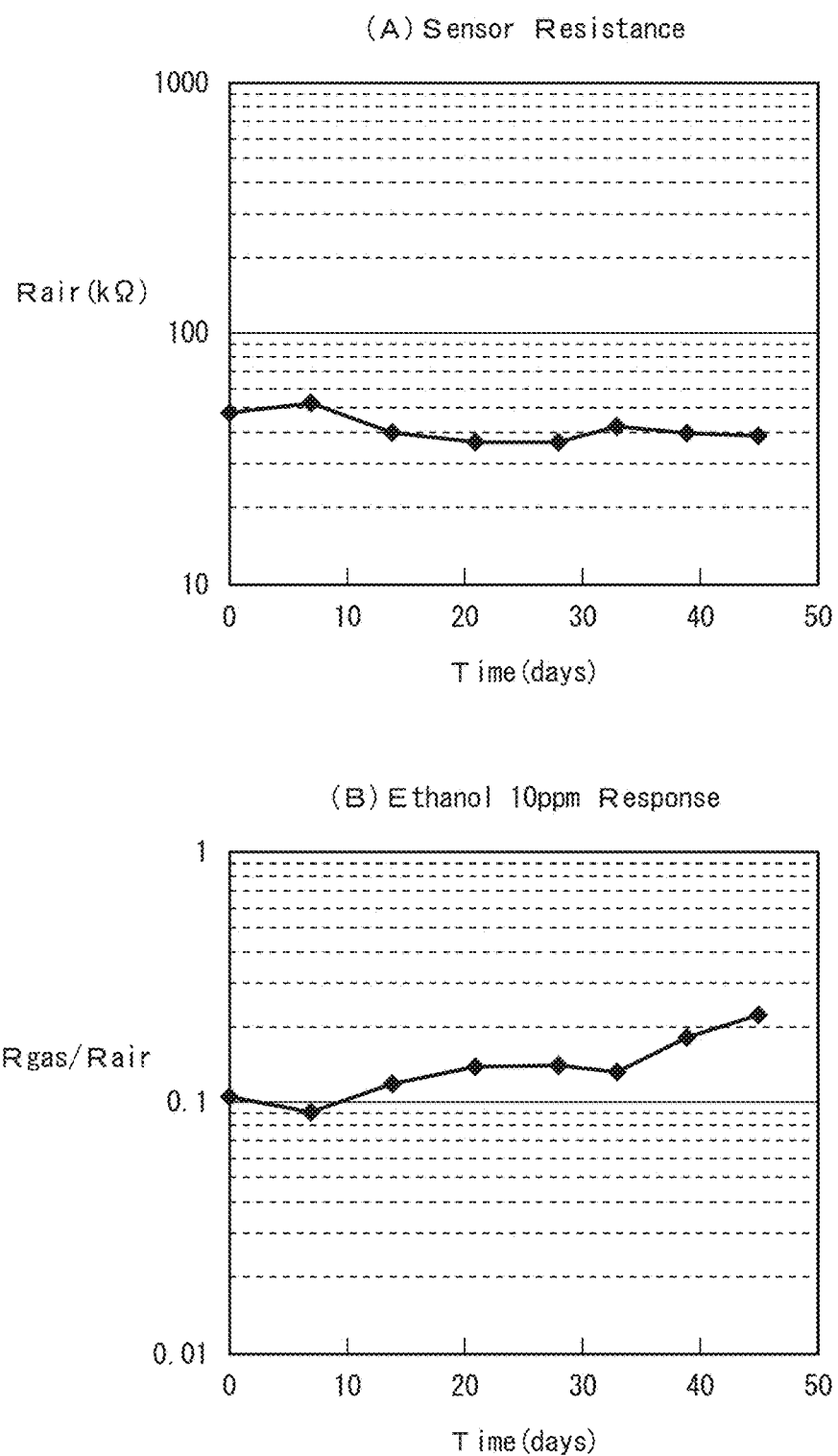
FIG. 9: A characteristic diagram when the gas sensor was heated with an extended 120 second period under the highly humid condition: in (A), the transition in gas sensor resistance under the humid condition is revealed, and in (B), the transition in gas sensor response is revealed.

| FIG. 5 | Not Heated |
| FIG. 6 | Continuously Heated |
| FIG. 7 | T = 0.5 sec, tau = 0.1 sec |
| FIG. 8 | T = 60 sec, tau = 0.1 sec |
| FIG. 9 | T = 120 sec, tau = 0.1 sec |

In FIGS. 5 and 6, the gas sensors 2 were substantially free from the influence of the highly humid atmosphere. However, it is not practical to heat the gas sensor 2 continuously with a battery power supply. In FIG. 7 where the heating period T was short and 0.5 second, the resistance in air increased during the first 10 to 20 days, and the gas response decreased. When the heating period T was elongated to 60 seconds (FIG. 8) or 120 seconds (FIG. 9), the gas responses decreased a little during the one and half month test. However, the influence of the humidity was by far smaller than the result in FIG. 7 where the gas sensor was operated with a 0.5 second period as usual.

Comparing the results in FIGS. 5, 8, and 9 with those in FIG. 7, it is clear that the influence of humidity can be reduced by elongating the heating period of the gas sensor 2 under highly humid atmospheres, preferably halting the heating so that the heating period becomes infinitely large.

LIST OF SYMBOLS

2 MEMS gas sensor
4 substrate
6 cavity
8 electrically insulating film
10 metal oxide semiconductor
12 heater
14 electrode
20 IC
21 switch
22 resistance
24 gas sensor drive
30 humidity sensor
32 temperature sensor
34 humidity sensor drive
36 temperature sensor drive
38 output interface
T heating period
tau pulse duration

What is claimed is:

1. A gas detector comprising:
   a MEMS gas sensor having: a substrate being provided with a cavity and an insulating film over the cavity; a metal oxide semiconductor being provided on the insulating film; and a heater being provided on the insulating film;
   a drive circuit operating said heater with a predetermined period for a predetermined pulse duration in order to heat said metal oxide semiconductor to 300 to 450 degrees Celsius, and performing gas detection according to electrical resistance of the metal oxide semiconductor when heated; and
   a detection means for humidity for detecting humidity in an atmosphere,
   wherein said drive circuit is configured and programmed to halt operation of said heater and stop performing gas detection for ethanol, Volatile Organic Compounds (VOC), hydrogen, or odorous substances, or to elongate said period, when said detection means for humidity detects that the atmosphere is humid.

2. The gas detector according to claim 1, wherein said drive circuit is configured and programmed to elongate said period at least by 10 times and to detect gas with the elongated period when said detection means for humidity detects that the atmosphere is humid.

3. The gas detector according to claim 1, wherein said detection means for humidity comprises a humidity sensor separate from said MEMS gas sensor.

4. The gas detector according to claim 1, wherein said detection means for humidity detects humidity according to a time constant for resistance of said metal oxide semiconductor to decrease when said metal oxide semiconductor is heated by said drive circuit.

5. A gas detection method using a MEMS gas sensor having: a substrate being provided with a cavity and an insulating film over the cavity; a metal oxide semiconductor being provided on the insulating film; and a heater being provided on the insulating film, said method comprising:
   a step for heating said metal oxide semiconductor by operating said heater to 300 to 450 degrees Celsius with a predetermined period for a predetermined pulse duration;
   a step for detecting gas according to electrical resistance of the metal oxide semiconductor when heated;
   a step for detecting humidity in an atmosphere by a detection means for humidity; and
   a step for halting operation of said heater and stopping detecting gas for ethanol, Volatile Organic Compounds (VOC), hydrogen, or odorous substances, or elongating said period by said drive circuit, when said detection means for humidity detects that the atmosphere is humid.

* * * * *